Patented Nov. 16, 1948

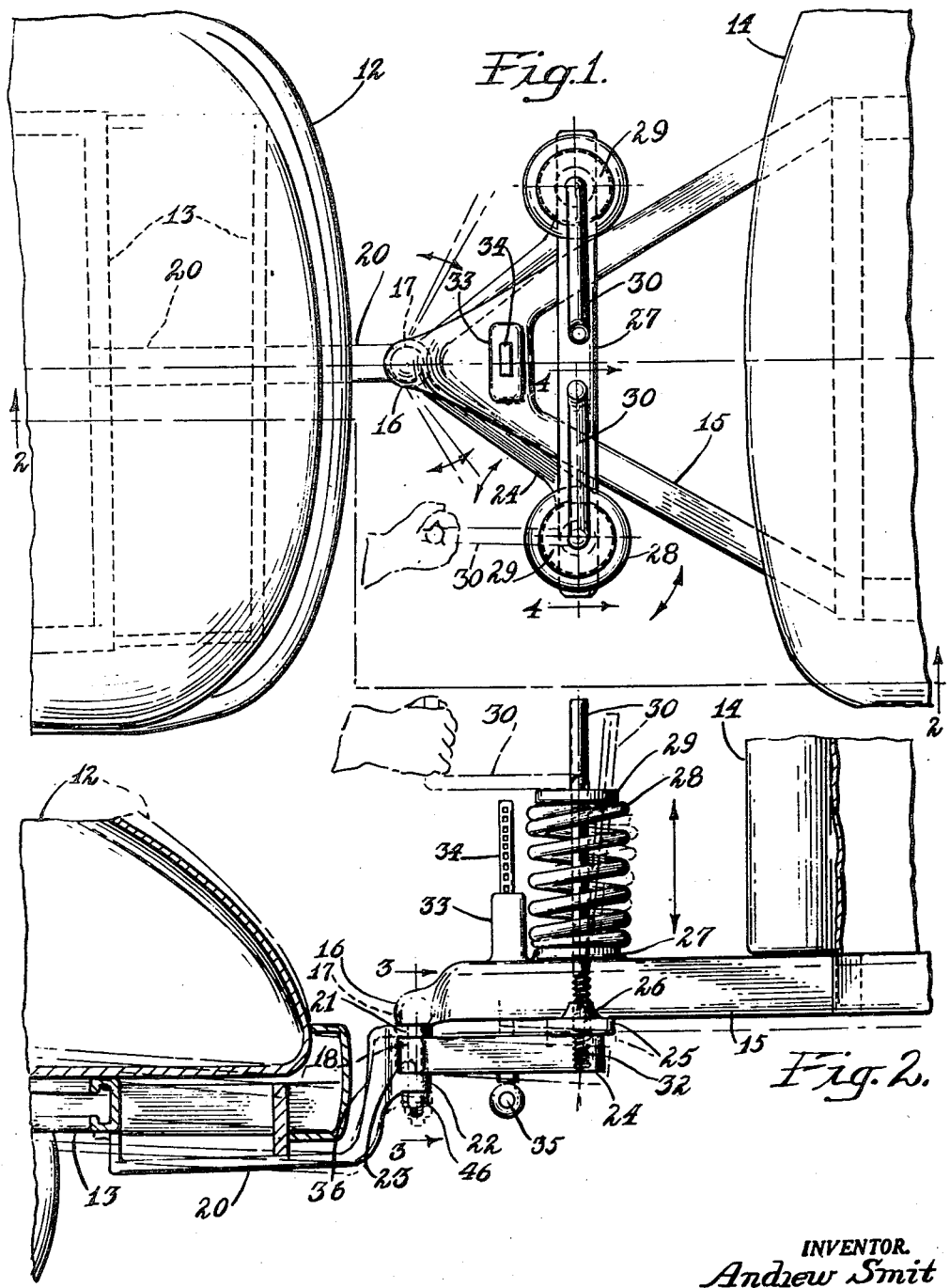

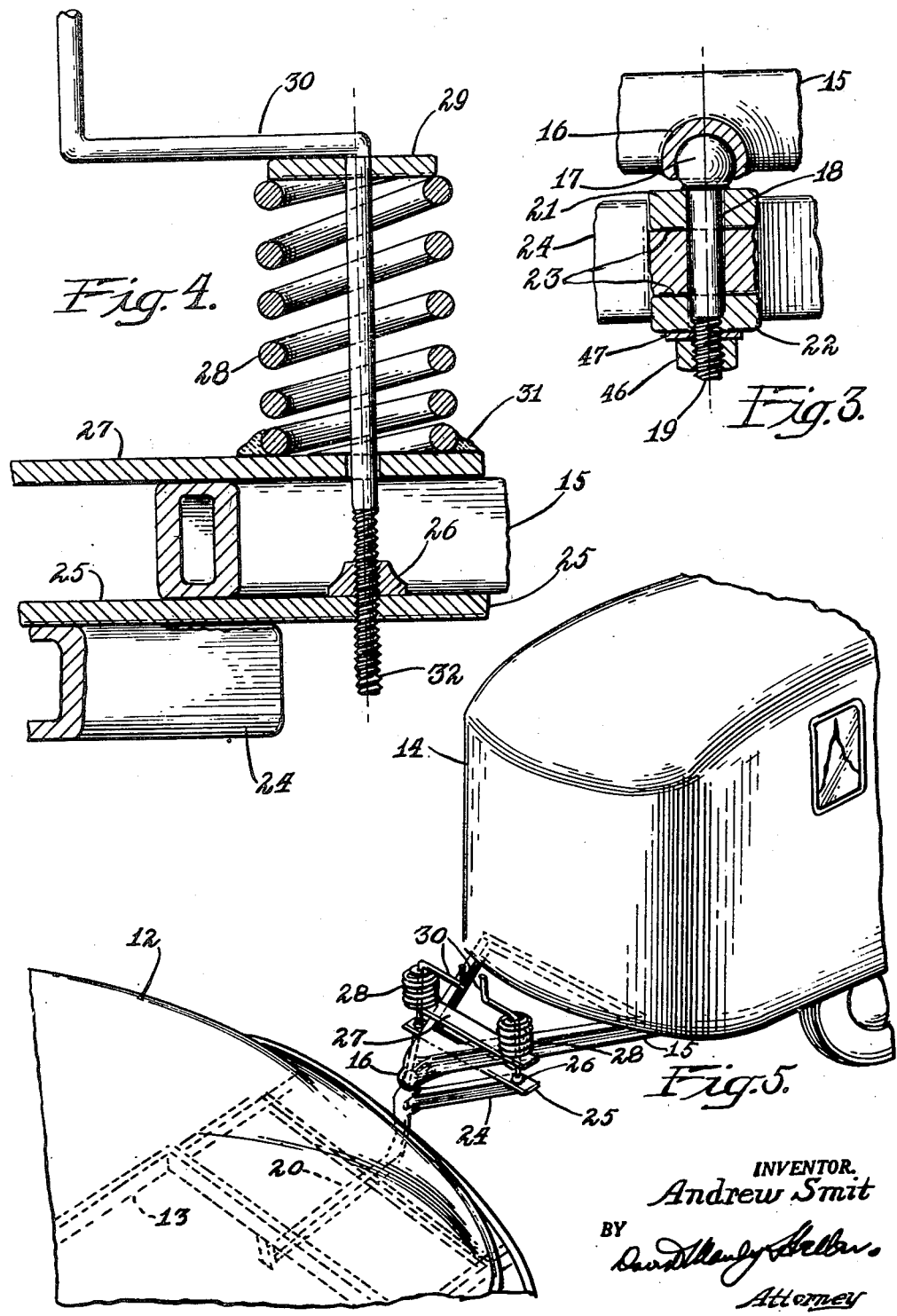

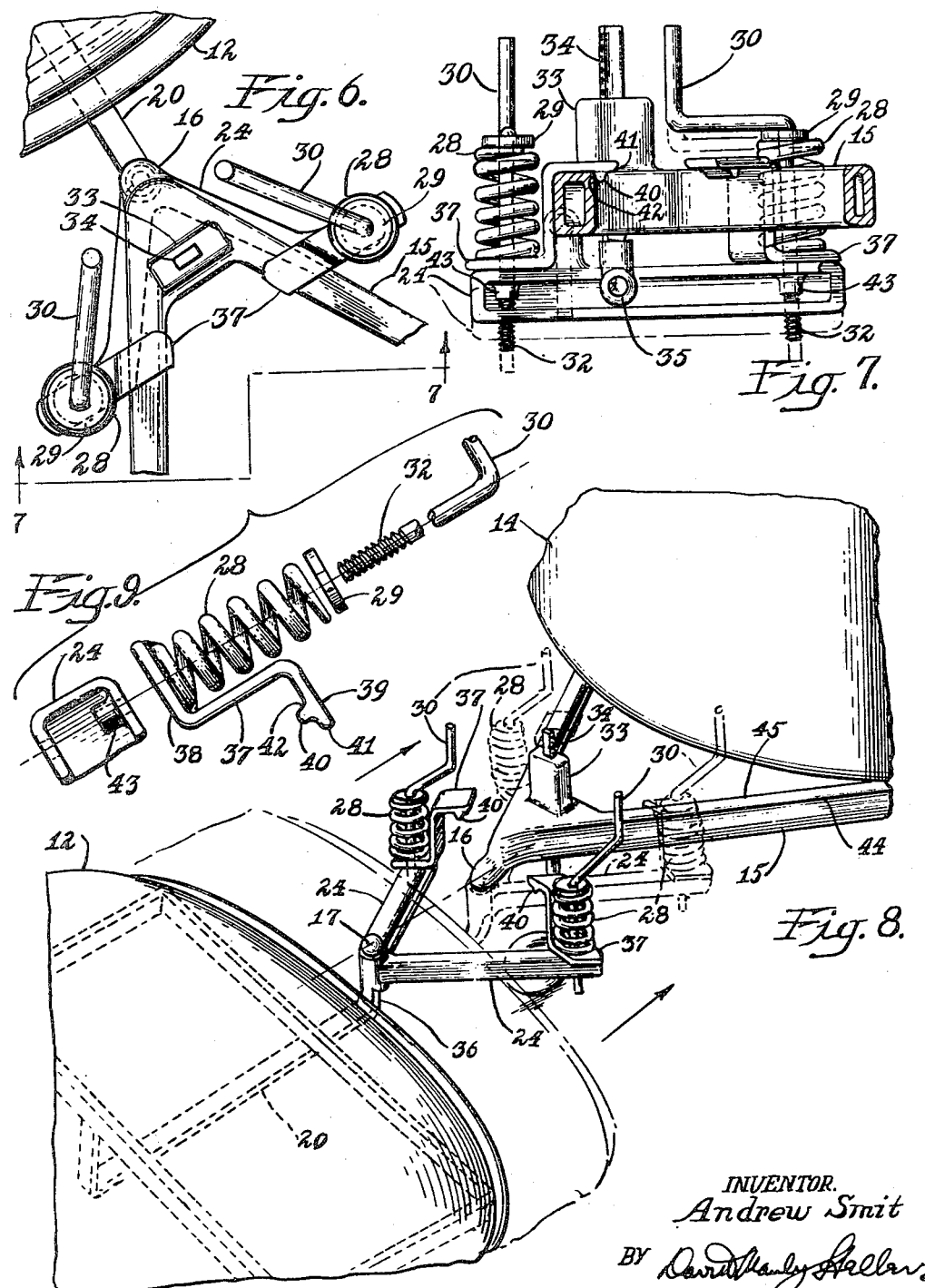

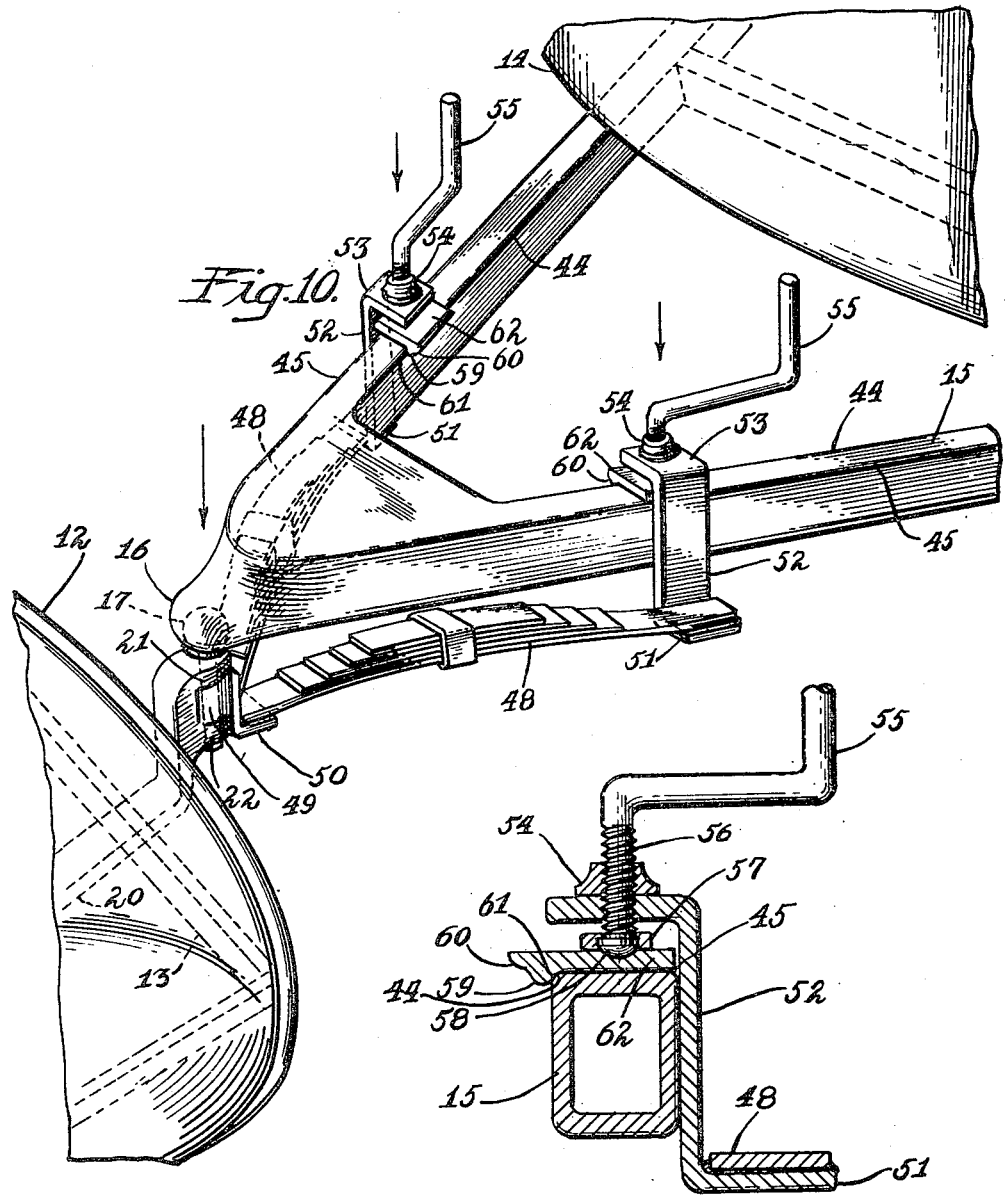

2,453,941

UNITED STATES PATENT OFFICE 2,453,941

TRAILER HITCH

Andrew Smit, Oak Lawn, Ill.

Application January 14, 1947, Serial No. 721,999

2 Claims. (Cl. 280—33.17)

My invention appertains to hitching means, particularly adaptable for hitching trailers onto tractors, or vehicles used for drawing trailers from one destination to another.

An important object of my invention is to provide a trailer hitching means, whereby the weight of the trailer is so distributed that it will minimize or eliminate over-burdening of the rear part of the tractor vehicle.

Another object of my invention is to provide hitching means of the aforementioned character, which automatically controls the course of the trailer when making turns, or when riding over bumps in the road, or concavities or depressions, in the road, or along the line of travel.

Another object of my invention is to provide a trailer hitching means wherein spring or resilient means is provided to amplify and improve upon the ordinary ball and socket connection now used for connecting trailers to tractors, or vehicles which pull them along, the said spring means being placed rearward of the said ball joint and acting to distribute the weight, or load of the trailer more evenly, at the same time relieving the ball and socket joint from undue stresses and strains, subsequently transmitted to the chassis of the tractor vehicle.

Another object of my invention is to provide a trailer hitching means of the aforementioned character, which will enable hitching the trailer, or releasing the trailer from the hitch by backing toward the trailer, or moving away therefrom, the hitching means working semi-automatically in attaching itself to the arms of the trailer hitching unit.

A further object of my invention is to provide in a trailer hitching means, of the aforementioned character, adjustable resilient means to compensate for increase, or decrease in the trailer load, which the said hitching means is to connect and to draw along the highway.

A further object of my invention is to provide a hitching means of the aforementioned character which is practical in construction, efficient for the purpose for whch it is purported to be used, and of such simple, elemental construction that it may be readily manufactured economically in quantity production.

Other features, ancillary objects, and advantages inherent in my invention will become apparent from an examination of the accompanying drawings, bearing further elucidation in the ensuing description, wherein like symbols are used to designate like parts, and in which:

Fig. 1 is a top, or plan view of the trailer hitching means comprising my invention as it is attached to a tractor vehicle and a trailer vehicle.

Fig. 2 is a view partially in cross-section, taken along the lines 2—2 of Fig. 1.

Fig. 3 is a cross-sectional view taken, substantially, on the lines 3—3 of Fig. 2.

Fig. 4 is a cross-sectional view taken, substantially, on the lines 4—4 of Fig. 1.

Fig. 5 is a perspective view of one form of my hitching means, in attachment to the rear of a tractor vehicle and to the forward end of a trailer vehicle.

Fig. 6 is a top view of a slightly modified form of my invention, showing the relative differences in structure in this modification of the trailer hitching means.

Fig. 7 is a front view of Fig. 6 looking in the direction of the arrows 7—7 of Fig. 6.

Fig. 8 is a perspective view of the slightly modified hitching means illustrated in Figs. 6 and 7 showing how a tractor may be backed up toward a trailer vehicle, for the hitching means to engage automatically by proper manipulation.

Fig. 9 is an exploded view of the resilient and adjustable load distributing and support means used as an important structural feature of my invention.

Fig. 10 shows another slightly modified form of my invention similar to that illustrated in Fig. 6, in which case the resilient means, instead of being a coil spring, is a carriage type of spring or a multiple leaf spring construction.

Fig. 11 is a cross-sectional view, taken substantially, through the longitudinal axis of one of the clamping units indicated in Fig. 10.

Referring to the various views, a tractor vehicle is generally designated 12, and a trailer vehicle is generally designated 14. The trailer vehicle is provided with an angular V-shaped structure 15 of sufficient rigidity to support the load of the trailer, and its contents, the said support 15 terminates at its vertex in a hemispherical, or in a partially spherical socket portion, which is designated 16, and which fits over the spherical or ball shaped end 17 of the supporting pivot element which has a cylindrical body 18 journalled in the extension 36 of the tractor attaching element or support 20, which is secured to the chassis 13 of the tractor vehicle. The extension 36 is provided with two lugs 21 and 22, intermediately thereof, the recess opening 23 therebetween being provided for housing articulately the V-shaped element 24, the bolt 18 serving to provide articulation to the V-shaped element 24 within the recess 23. The head of the V-shaped element 24, preferably, is straddled by a plate, or strut 25 which may be welded to the frame 24; the said plate being provided with bushing extensions 26 which are suitably threaded so as to receive the threaded end 32 of the adjustable spring clamping units 30. The said clamps 30 are made in the form of crank handles and are passed through the upper strut 27, or in other words, through the two struts 27 and 25 firmly securing the trailer support 15 therebetween. The plate 27 is acted upon by the pressure exerted thereon, resulting from the tension to which the springs 28 are subjected; the said springs 28 being compressed or distended, depending upon the rotation of the crank handles 30 downwardly or upwardly, which in turn moves the washers 29 downwardly or upwardly, the lower coils of the spring being preferably welded as at 31 to the plate 27, or they may be secured in any other suitable fashion. The lock bolt 18 may be secured at its threaded end 19 by a nut 46 and a washer 47. The trailer support 15 is also provided with an extension 33, in which is mounted the adjustable rod 34, the terminus of which 35 is adapted to support a wheel removably for acting as a support for the trailer, when it has been unhitched and deposited at a particular locality awaiting further transportation.

In Fig. 1, it can be seen that the knuckle joint, or the ball joint permits the trailer to articulate in a horizontal position, radially, as indicated by the arrows when it is drawn by the tractor vehicle 12. The knuckle joint and the spring structure 28, heretofore described, also permit of an actuation upwardly and downwardly for the load independent of the movements of the tractor vehicle 12, and hence the trailer can follow along without overburdening or straining the rear end connection to the tractor vehicle when going over bumps or depressions in the road, along which the hitched trailer and tractor may be travelling.

A slightly modified form of my invention is illustrated in Figs. 6, 7, 8 and 9 wherein the V-shaped element 24 has secured thereto a pair of clamps 37 by virtue of the crank handle 30 which is threaded into the boss, or extension 43 on the V support 24, the same being articulately connected, whereas the trailer support 15 is also firmly secured in universal movement relationship by means of the socket portion 16 heretofore mentioned.

The clamping means in this particular instance is somewhat different, consisting of the clamps 37 having their base portions 38 resting on the top surface of the V support 24, and having a top extension 39 with a beaded extension 40 thereunder, forming the retaining ledge 42 for clamping over the edge 45 of the trailer support 15, at the same time providing a rounded lip portion 41 so that when the tractor vehicle 12 is backed up, as shown by the dotted lines, towards the trailer, the lips 41 will cam upwardly over the edge 44 and cause the bead 40 to straddle over the edge 45 causing the clamps 37 to have their ledges 42 to clamp over the edge 45. After that is accomplished, the crank handles 30 may be adjusted to subject the springs 28 to the proper tension, depending on the load in the trailer. The springs 28 in this instance may be welded to the bottom or base 38 of the clamp 37.

The form of trailer hitching means illustrated in Figs. 6–9 operates, and functions, and has the same attributes as that illustrated in Figs. 1–5. In Fig. 10 I show a perspective view of a slightly modified form of hitching means which is similar to that illustrated in Figs. 6–9 with the exception that the clamping means 52 is slightly modified in order to accommodate the leaf or carriage spring structure 48 replacing the coil spring structure 28 indicated in the other views.

In this particular instance, I utilize a bearing block 49, having an angular base portion 50 instead of the V block formation is provided by the carriage springs 48 which are welded, or otherwise suitably secured at 50, the other terminals of the said carriage spring being secured to the base portion 51 of the support clamps 52, the upper portion 53 of the clamps 52 on which I preferably secure a bushing 54, so as to provide a sufficient thread for the threaded portion 56 of the crank handle 55. The crank handle is slightly modified so as to have a hemispherical bearing portion 58 secured within the washer 57 and the clamp element 62. This clamp element 62 is further provided with a rounded lip portion 60, a bead or rib 59, so that it will ride over the edge 45 of the trailer hitching support 15, having a niched portion 61 to lock over the edge 44 of the trailer support 15. Thus, the crank handle may be adjusted by rotating it clockwise, or counterclockwise subjecting the carriage springs 48 to greater or lesser tension, depending on the requirement of the load in the trailer 14.

To remove the trailer, or to unhitch the same, it is only necessary to relieve the load from support by the springs 48 and the same may then be lifted off by removing its socket 16 from the ball support and allowing the same to rest on the trailer wheel which is not shown in Fig. 10, for clarity, and to depict the elemental, structural features of my invention.

I wish to stress once again that the nature of my invention is a hitching means having the attributes and advantages of taking the load from its concentration on the rear structure of the tractor vehicle, and distributing the load to the rear thereof, that is, having the load taken up primarily by a resilient spring structure intermediate the trailer and tractor vehicles to compensate, by adjustment, for the varied loads that may be contained within the trailer, the said construction permitting relieved and smooth following of the trailer when hitched to the tractor vehicle, in such a manner that the trailer may move horizontally and radially, and will also be actuated in a more or less limited universal movement, or action vertically to compensate for any irregularities such as bumps or depressions in the pavement, or the highway, over which the tractor and trailer vehicles may be travelling.

Another feature of my invention that I wish to stress particularly is that the modified structures show that the same features may be retained with a basic construction, which can be more readily backed up toward a trailer to facilitate hitching and unhitching of the trailer from the tractor vehicle; the operation being more or less semi-automatic, although it may require slight skill and proper manipulation of the tractor vehicle to effectuate the hitching or unhitching of the tractor from the trailer.

I believe, I have described in expository form, rather succinctly, the nature of the construction, and the operation, as well as the advantages of my hitching means, and inasmuch as the same is susceptible of modifications, alterations and improvements, I herein reserve the right to all such modifications, alterations and improvements coming within the scope and spirit of my invention, as well as all those embraced in the accompanying drawings, and any that may fall within the purview of the foregoing description; my invention to be limited only by the appended claims.

Having thus described and revealed my invention, what I claim as novel, and desire to secure by Letters Patent, is:

1. A tractor and trailer hitching means comprising, a stationary support secured to a tractor vehicle, a V-shaped support secured to the said first mentioned support to articulate in a horizontal plane, pivot means securing the said V-shaped support to the said first-mentioned support and provided with an exposed ball-shaped portion, an angular support secured to a trailer vehicle and having at its apex a socketed portion secured to the said ball-shaped portion affording limited universal movement to the said angular support, upper and lower strut means arranged in parallel relationship over and under the said angular support, crank means adjustably engaging the said lower strut means, and spring means confined between the said crank means and the said upper strut means normally urging the said angular support towards the said V-shaped support.

2. A tractor and trailer hitching means comprising, a stationary support secured to a tractor vehicle, a V-shaped support secured to the said first mentioned support to articulate in a horizontal plane, pivot means securing the said V-shaped support to the said first-mentioned support and provided with an exposed ball-shaped portion, an angular support secured to a trailer vehicle and having at its apex a socketed portion secured to the said ball-shaped portion affording limited universal movement to the said angular support, upper and lower strut means arranged in parallel relationship over and under the said angular support, crank means adjustably engaging the said lower strut means, and spring means confined between the said crank means and the said upper strut means normally urging the said angular support towards the said V-shaped support, the said trailer vehicle being capable of limited horizontal and limited universal movements independently of the movements of the said tractor vehicle.

ANDREW SMIT.

REFERENCES CITED

The following references are of record in the file of this patent:

UNITED STATES PATENTS

| Number | Name | Date |
|---|---|---|
| 2,223,375 | Le Tourneau | Dec. 3, 1940 |
| 2,385,099 | Nelson | Sept. 18, 1945 |